April 22, 1958 G. REZEK 2,832,046
MAGNETIC FLUX METHOD OF AND MEANS FOR MEASURING
THE DENSITY OF DIRECT CURRENT
Filed Dec. 7, 1951 3 Sheets-Sheet 1

INVENTOR
GERARD REZEK,

BY Stone, Boyden & Mack.
ATTORNEYS.

INVENTOR
GERARD REZEK,

April 22, 1958

G. REZEK 2,832,046

MAGNETIC FLUX METHOD OF AND MEANS FOR MEASURING
THE DENSITY OF DIRECT CURRENT

Filed Dec. 7, 1951

INVENTOR
GERARD REZEK,

BY Stone, Boyden & Mack,
ATTORNEYS

United States Patent Office 2,832,046
Patented Apr. 22, 1958

2,832,046

MAGNETIC FLUX METHOD OF AND MEANS FOR MEASURING THE DENSITY OF DIRECT CURRENT

Gerard Rezek, Philadelphia, Pa., assignor to Fox Products Company, Philadelphia, Pa., a corporation of Pennsylvania Application December 7, 1951, Serial No. 260,369

1 Claim. (Cl. 324—117)

This invention relates to a method of and apparatus for measuring or obtaining a response to the density of the current flowing through a bath of conducting liquid, and more particularly for measuring the current density at any desired point in such a bath.

In application Ser. No. 252,742, filed October 23, 1951, by Godshalk, Medlar and Keck, now abandoned and superseded by continuation-in-part application Ser. No. 407,418, filed February 1, 1954, now Patent No. 2,802,182, and in application Ser. No. 255,233, filed November 7, 1951, by myself, now Patent No. 2,795,759, various methods and means are disclosed for accomplishing the same general result. In both of these applications the specific means disclosed for detecting current density depended upon the current in the bath being measured to be a periodically varying one, or at least having a periodic or pulsating component.

As distinguished from the two above mentioned applications, the present invention is designed to measure the density of a uniform, direct current, as well as a periodic one, flowing through a bath of conducting liquid.

As in my above mentioned prior application, the present invention employs the null method of measurement which is much more accurate than the direct method disclosed in application Ser. No. 252,742.

As in both of the above mentioned applications, I herein employ a freely movable, ring-like core of high permeability magnetic material, which additionally is readily saturated at low levels of magnetic field intensity and is adapted to be immersed at any desired point in the bath, and having a helical coil of insulated wire wound thereon. In the present case, the measurement of the current density is achieved by means of changes in the inductance of the coil due to the flux set up in the core by current flowing in the bath through the opening of the core. This varying flux changes the permeability, and hence the self inductance. In other words, when the coil is fed with a high frequency periodic current, its reactance is changed by the flux due to the bath current.

There are many ways in which this change of inductance or reactance can be utilized to indicate the strength or density of the current flowing through the bath.

One satisfactory method is by opposing and neutralizing the flux generated in the core by current flowing in the bath by current flowing in the opposite direction through the opening of the core in an auxiliary circuit preferably derived from the same source as the current fed to the bath. This source may be either periodic or direct. When the flux is completely neutralized, the value of the current flowing in the auxiliary circuit serves to indicate the density of the current in the bath at the point where the coil is immersed.

In this embodiment the coil is connected in one arm of a bridge, and a null method employed for determining when the flux in the core is neutralized, as indicated by the balancing of the bridge. This method possesses a high degree of sensitivity and accuracy.

In another embodiment, a bridge is utilized as above, but instead of balancing the bridge and employing a null method of measurement, the changes in the reactance of the coil are indicated by a suitably calibrated meter connected to the output of the bridge.

In a third embodiment, no bridge is employed, but the meter is connected in series with the coil and a source of periodic current of constant voltage and frequency. Changes in the reactance of the coil produce corresponding changes in the amount of current flowing through the meter.

In yet another embodiment, a phase meter is employed, changes in the inductance of the coil producing a corresponding shifting of phase of the periodic current.

In still another modification, the changes in inductance of the coil are indicated by changes in the frequency of an oscillator to which the coil is connected, and a suitable meter employed to indicate the extent of such changes.

Many other modifications could be given, but it is believed that the foregoing examples will suffice to illustrate the wide variety of methods which may be used.

As above indicated, one of the chief advantages of the invention is that it provides a method capable of measuring the density of a uniform, direct current flowing in a bath of conducting liquid, which, so far as I am aware, is a result not hitherto achieved.

In order that the invention may be readily understood, reference is had to the accompanying drawing, forming part of this specification, and in which.

Figure 1:
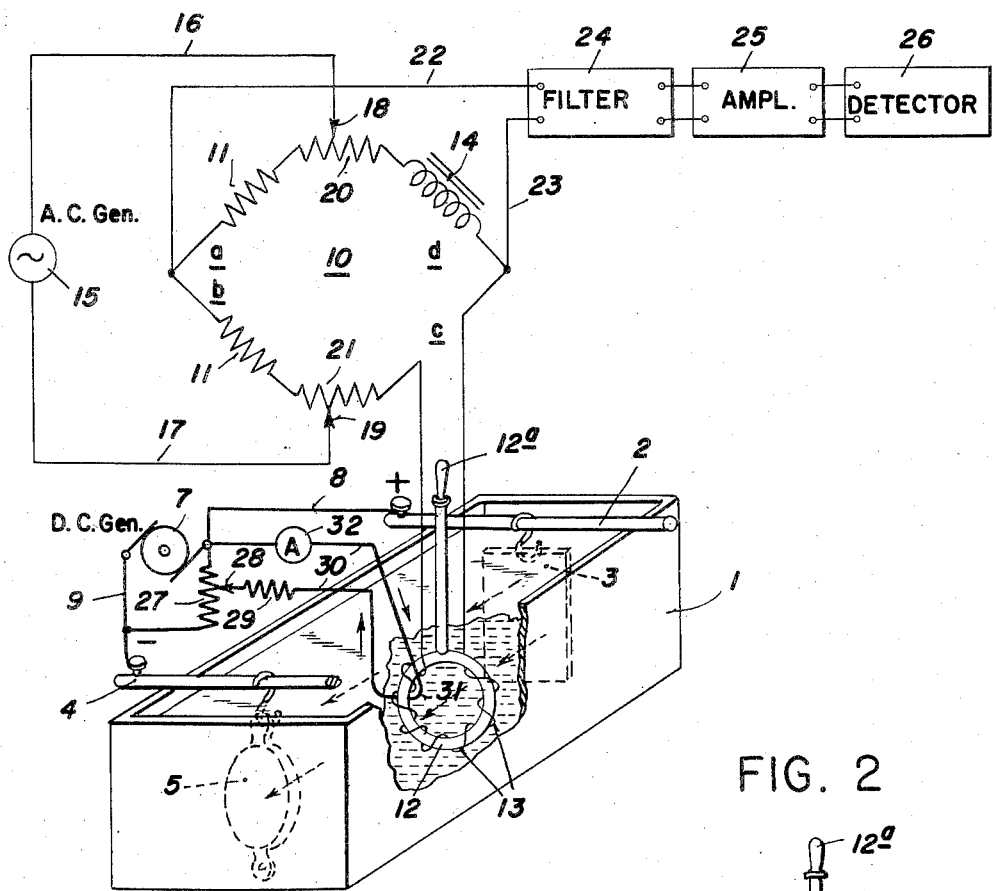
Fig. 1 is a complete diagram showing the electrical circuits employed in one form of the first embodiment.

Referring to the drawings in detail, and more particularly first to Fig. 1, a conventional plating vat containing a conducting liquid is illustrated at 1, having the usual anode and cathode bars 2 and 4 from which are suspended a metal plate 3 and the object to be plated 5.

7 designates a direct current generator supplying current to the anode and cathode bars through conductors 8 and 9.

10 designates a bridge of four arms, having suitable resistances 11, in two of the arms *a* and *b* thereof. In the arm *c* is connected a helical coil 13 of insulated wire wound upon a ring-like core 12 of magnetic material of high permeability which is saturable at relatively low values of magnetic field intensity.

In the fourth arm *d* of the bridge is an inductance 14.

An alternating current generator 15 is connected to two opposite corners of the bridge by means of wires 16 and 17, having at their ends slides 18 and 19 movable over resistances 20 and 21, by means of which suitable adjustments may be made. This generator is preferably of fairly high frequency, although lower frequencies, such for example as 60 cycles, may be employed.

To the opposite corners of the bridge are connected wires 22 and 23 which deliver the output of the bridge to a filter 24 and thence to an amplifier 25 and detector 26. This detector may be of any suitable kind but is preferably of the type known as the "magic-eye," which is extremely sensitive.

It will be noted that alternating current from the generator 15 flows from the slide 18 through the inductance 14 and winding 13 in series and back through the slide 19.

The parts are so chosen and adjusted that the reactance of the inductance 14, which may be referred to as a standard inductance, bears the same ratio to the reactance of the coil 13 wound on the core 12, as the respective resistances 11 do to each other, so that the bridge is normally balanced and the detector 26 indicates that the output of the bridge is zero.

When, however, the exploring coil 13 and core 12 are immersed in the plating bath, in such a position that part of the current flowing in the bath passes through the opening of the coil, as indicated by the dotted arrows, this part of the current sets up a magnetic flux in the core 12 and the presence of this flux reduces the reactance of the coil 13, so that the bridge is no longer balanced.

As in my prior application Ser. No. 255,233, above referred to, it is preferable to so position the coil in the bath that it lies in a plane at substantial right angles to the direction of current flow. It is not essential, however, that the coil be placed in this position. All that is necessary is that it be placed in such angular position that some of the current flowing in the bath passes through the opening of the coil and core. When the coil and core are placed at right angles to the direction of current flow, the entire area enclosed is the effective area used in determining the current density in the bath. If however the coil is so placed that its plane lies at some angle less than a right angle, to the direction of current flow, then the effective area is the projection of the actual area on a plane lying at right angles to the direction of current flow, and this projected, effective area is proportional to the cosine of the angle which the coil makes with a plane lying at right angles to the direction of current flow. Thus the effective area may be readily computed, or a meter calibrated, for any given angular position of the coil. Where, therefore, in the specification and claims, reference is made to the "area" of the coil or core, or the "area" enclosed thereby, the effective area, as above defined, is intended.

In order to again balance the bridge, after it has been unbalanced, as already described, and to determine the value of the current flowing in the bath through the area of the ring-like core, I provide a shunt circuit around the terminals of the direct current generator 7, such circuit including a resistance 27. I also provide an auxiliary circuit comprising a slide 28 adjustable along the resistance 27, a conductor 30, and a resistance 29, the conductor 30 being looped through the core 12, as indicated at 31, and containing a current measuring instrument 32 in the nature of an ammeter. It will be particularly noted that, as indicated by the arrows, the current flows through this loop where it passes around the ring 12 in a direction opposite to that in which the current flows through the bath. Thus, the current in this auxiliary circuit tends to generate in the core 12 a flux which opposes the flux set up by the current flowing in the bath through the area enclosed by the ring.

In making my measurements, I adjust the slide 28 until the current in the auxiliary circuit is just sufficient to completely neutralize the flux in the core 12. When this occurs, the reactance of the coil 13 is increased until it is again proportionate to that of the standard inductance 14, and the bridge is again balanced, as indicated by the detector 26. When such balancing occurs, the value of the current flowing in the auxiliary circuit, as shown by the meter 32, indicates the density of the current flowing in the bath at the point where the core 12 and coil 13 are immersed. In other words, it is clear that when the flux in the core 12 is completely neutralized, the current in the auxiliary circuit must be proportional to the current flowing in the bath through the area enclosed by the ring. The meter 32 may be calibrated to read current density directly as, for example, amperes per square unit of cross-sectional area.

From the above it will be understood that I am thus enabled to measure the density of a direct current flowing in the bath at any desired point. The operation of the apparatus depends not upon any periodic component in the bath current, as in my prior above-identified application, but upon the change in reactance of the exploring coil when supplied with current from an independent generator of periodic current.

It is obvious that, to provide a high degree of sensitivity, the material of the core 12 should be such that it is saturated by a very few ampere turns so that it will readily respond to small differences between the current in the bath and the current in the auxiliary circuit. It has been found that one material which becomes saturated at a very low level of ampere turns is a special high nickel alloy known as "Supermalloy."

The placing of the coil 13 in series with the standard inductance 14 has a decided advantage, as regards the sensitivity of the arrangement. Thus, any reduction in the voltage drop across the coil 13 due to saturation of the core will increase the current therethrough. This increased current will increase the voltage drop across the standard inductance, thus doubling the effect of the change in reactance of the coil 13.

The system as illustrated is insensitive to external alternating current fields since the filter will screen out any frequency other than the bridge frequency, and this bridge frequency is preferably chosen so as to be considerably different from that of any likely external fields.

It will be understood that the exploring device comprising the core 12 and coil 13 are preferably provided with a handle 12ᵃ by which they may be manipulated, and the entire apparatus may conveniently be mounted in a box containing the meters and controls and connected with the handle 12ᵃ by means of a flexible cable, the same as illustrated and described in my above identified prior application.

Figure 2:
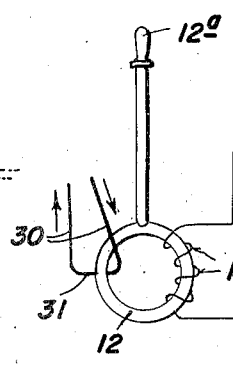
Fig. 2 is a fragmentary diagrammatic view illustrating a modified form of exploring coil.

While I have illustrated the coil 13 in Fig. 1 as uniformly distributed around the core 12, such uniform distribution is not essential. The coil may be concentrated on one part of the core as indicated at 13' in Fig. 2, if desired, in which case the conductor 30 may surround the part of the core on which the coil is not wound.

In describing the above arrangement of shunt 27, for energizing the auxiliary circuit, as shown in Fig. 1, it has been assumed that the generator 7, supplying the bath, delivers an absolutely uniform, direct current. With this assumption, the arrangement shown and described gives satisfactory results.

If, however, the generator delivers a current having a periodic component, such as, for example, might result from a commutator ripple, or if current is supplied to the bath from a rectifier, such as disclosed in my above mentioned application Ser. No. 255,233, then the arrangement of Fig. 1 would give rise to an error, due to the polarization of the bath, if such polarization is present.

Figure 3:
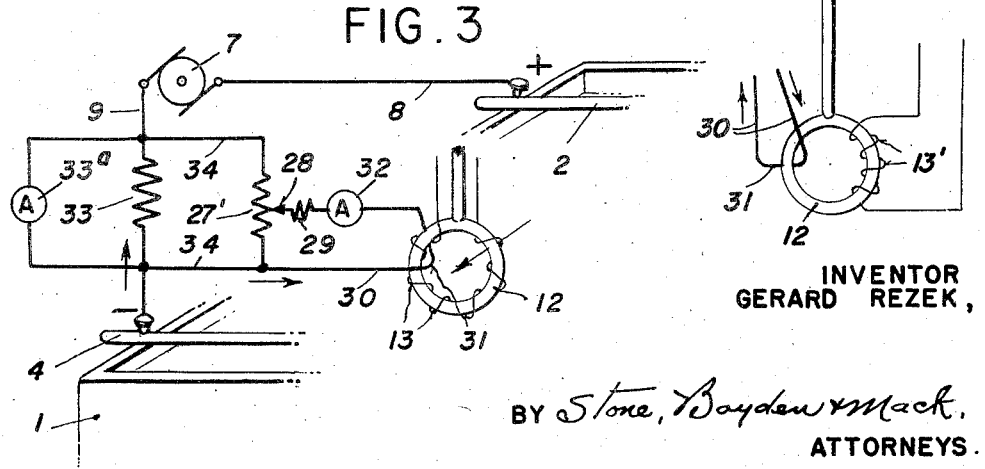
Fig. 3 is a fragmentary diagram similar to Fig. 1 but showing a different arrangement of shunt.

In case the source supplying the bath delivers a periodic current, or a current having a periodic component, it is preferable to employ the shunt arrangement shown in Fig. 3. This arrangement, of course, is also applicable to uniform, direct current, as well as to periodic current, and so may be used for either.

Referring to Fig. 3, I employ instead of the shunt resistance 27, a low resistance meter shunt 33, having an ammeter 33ᵃ connected with it, interposed in one of the leads supplying the bath, as, for example, the lead 9. Bridged across this shunt, by means of wires 34 is a relatively high resistance potentiometer 27'. The auxiliary circuit includes the conductor 30, having one end connected with one side of the shunt and potentiometer, and the other end terminating in the slide 28 adjustable along the potentiometer 27', a meter 32 and resistance 29 being interposed in this circuit, as in Fig. 1. As in my above identified application, the use of this type of shunt produces in the auxiliary circuit a current of exactly the same character as the bath current, whatever this character may be, and thus gives results which are entirely accurate and free from error, under all conditions, whether or not polarization is present.

While I have illustrated deriving current to power the auxiliary circuit by means of a shunt from the same source as that which supplies the bath, it will be understood that current for the auxiliary circuit may be obtained from an entirely independent source, such as a battery or separate D. C. generator, or from a rectifier similar to that supplying the bath but fed from a separate source of alternating current of the same character.

Figure 4:
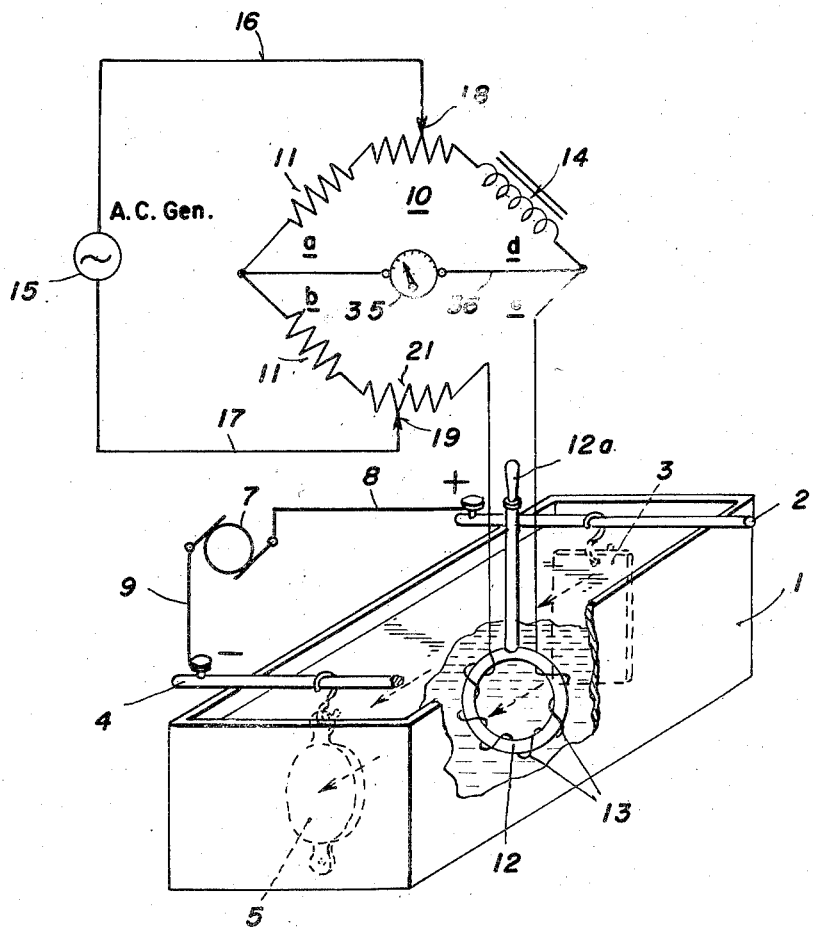
Fig. 4 is a view similar to Fig. 1 but illustrating an arrangement for obtaining a direct reading from the bridge.

In Fig. 4 I have illustrated another embodiment or modification of the invention. While in Figs. 1 to 3 I have shown a null method of measuring, in Fig. 4 there is shown apparatus for direct measuring. Here I employ a bridge similar to that of Fig. 1, having the coil connected in one arm $c$ and a balancing inductance 14 in the adjacent arm $d$, while the A. C. generator is connected with opposite corners of the bridge, as before. The output of the bridge is connected by wires 36 with a suitable instrument 35 of the volt meter type. With no current flowing in the bath, the slides 18 or 19 are adjusted until the bridge is balanced, as shown by a zero reading of the meter 35. Then, when current flows in the bath, this current, passing through the opening of the coil and core, sets up a magnetic flux in the core, which reduces the reactance of the coil, as above explained. This reduction of reactance of the coil will, of course, unbalance the bridge, thus producing a difference of potential at the terminals of the meter 35, and causing the needle to move in proportion to the amount of unbalance. By proper calibration of the meter, the density of the bath current, which caused the reduction in the reactance of the coil, can be read directly from the scale.

Figure 5:
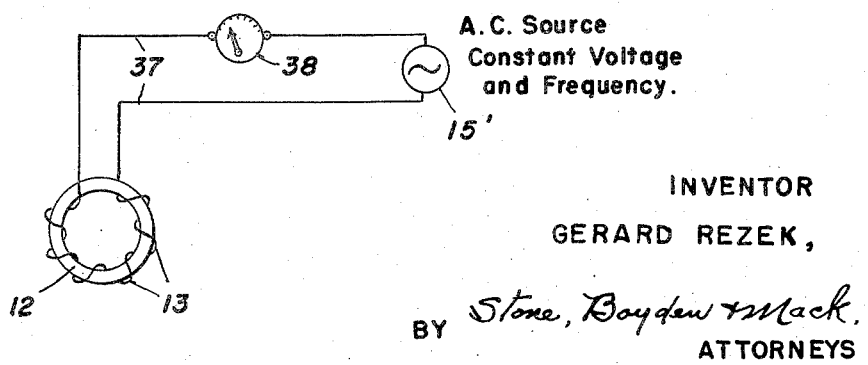
Fig. 5 is a fragmentary diagram illustrating another direct reading arrangement.

In Fig. 5 I have illustrated another and even simpler direct reading method. In this modification, the bridge is dispensed with entirely, and the coil simply connected by wires 37 to an A. C. source 15' of constant voltage and frequency, an instrument 38, of the ammeter type being interposed in the circuit in series with the coil. With no current flowing in the bath, the inductance or reactance of the coil is a maximum, and the current through the meter is a minimum. The position of the pointer under these conditions may be marked "zero" on the scale. Then when current flows through the bath and the opening in the coil and core, the reactance of the coil is reduced, and current from the A. C. source through the coil and meter is correspondingly increased. By proper calibration, the current density in the bath may be read directly from the scale.

Figure 6:
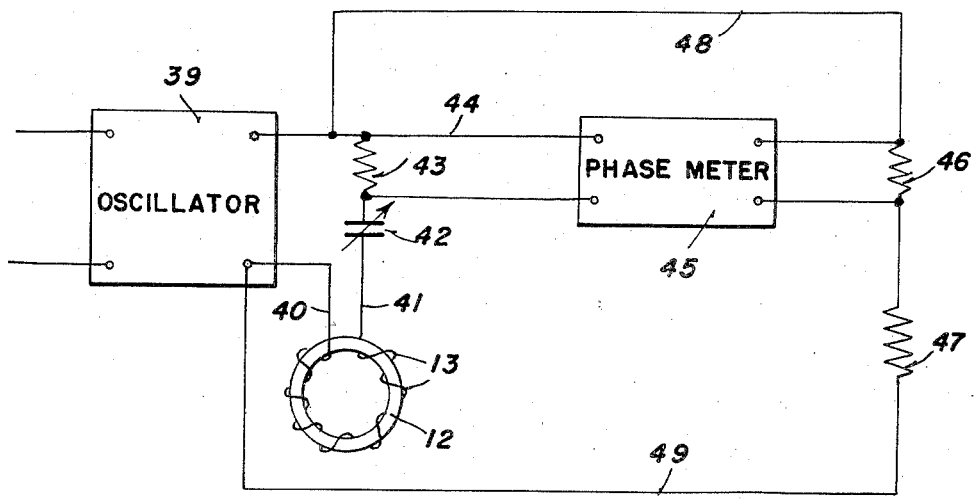
Fig. 6 is a diagram illustrating how a phase meter can be employed for indicating the extent of change of reactance in the coil.

In Fig. 6 I have shown an arrangement in which the change in inductance of the coil due to the generation of magnetic flux in the core by current flowing in the bath is measured by means of a phase meter. In this figure, 39 designates a generator of high frequency periodic current, such as an oscillator, and one terminal of this is connected by conductor 40 with the coil 13. The other side of this coil is connected through wires 41 and 44 with the other terminal of the oscillator, an adjustable condenser 42 and resistance 43 being interposed in this connection. A phase meter 45 has two of its terminals bridged across resistance 43, and the other two bridged across a similar resistance 46. One end of the latter is connected through a resistance 47 by wire 49 with the conductor 40, while the other end is connected through wire 48 with wire 44. From this it will be seen that the circuit containing the coil 13 and the circuit containing the resistances 46 and 47 are connected in parallel with the terminals of the oscillator. Since the circuit containing the resistances is a purely resistive one, the current therein will always be in phase with the applied voltage, and the voltage across resistor 46, which supplies one side of the phase meter, is always in phase with the oscillator voltage. The voltage developed across resistor 43, which supplies the other side of the phase meter, is in phase with the current through the coil 13 and condenser 42, the phase of which, relative to the supply voltage changes as the inductance of the coil is changed. The purpose of the resistor 46 is, therefore, to provide a standard with which to compare the phase shift in resistor 43 due to changes in the inductance of the coil.

With the coil 13 out of the bath, the condenser 42 is adjusted until the circuit, including the coil, condenser and resistance 43 is tuned to resonance with the oscillator, and the phase meter indicates a normal reading. When the coil is immersed in the bath through which current is flowing, such current, passing through the opening of the coil and core, generates a magnetic flux in the core, thus changing the inductance of the coil. This change of inductance throws the above mentioned tuned circuit out of resonance, thus causing a shifting of phase of the high frequency current in resistor 43, as compared with that in resistor 46, which phase shift is registered on the phase meter. The degree of phase shift is proportional to the change of inductance of the coil, which, in turn, is proportional to the density of the current in the bath.

Figure 7:
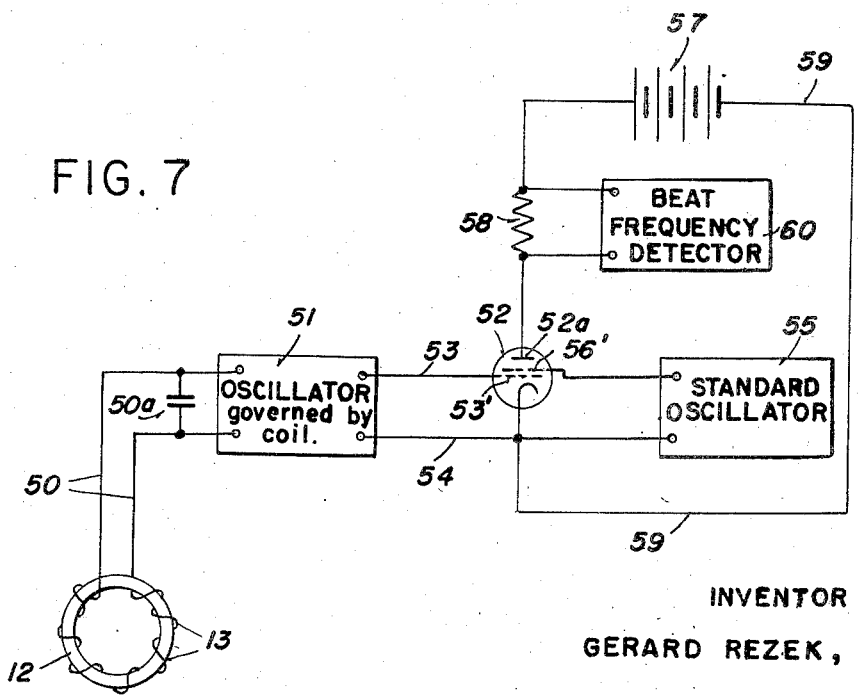
Fig. 7 is a similar diagram illustrating how a change in frequency of a high frequency source may be employed to indicate the change in reactance of the coil.

Finally, in Fig. 7, I have shown an arrangement in which the extent of the change of inductance of the coil, and hence the density of current in the bath, is measured by the change in the frequency of a high frequency current supplied to the coil.

In this figure, I provide an oscillator 51, the frequency of which is governed by the inductance of the coil 13, and which is connected with the coil by leads 50, across which is bridged a condenser 50$^a$.

I also provide a second or standard oscillator 55, with which the frequency of the first oscillator may be compared.

Connected to both oscillators is a vacuum tube 52, of the type commonly known as a "mixer" tube. It has two independent grids 53' and 56', the former being connected by wire 53 with the first oscillator, and the latter being connected by wire 56 with the second or standard oscillator. The tube has the usual plate 52$^a$ and filament 52', connected by wire 59 with a suitable battery 57, the filament being also connected by wire 54 with both oscillators. In the plate circuit I interpose a resistor 58 to develop the output voltage of the tube. The voltage taken off of this resistor is fed into a beat frequency detector 60.

Now if either oscillator were operating alone, it would have its own effect on the plate current of the tube, independently of the other, that is to say, it would produce in the output of the tube an amplified current of the same frequency as the input, i. e., its own frequency. So when both oscillators are operating, the combined effect is to produce in the output circuit a complex current having the characteristics of the sum and difference of the two frequencies. The function of the device 60 is to detect the change or difference in frequency between the standard and the variable oscillator. This difference in frequency is commonly called the "beat frequency." If the two frequencies are equal, obviously there will be no beat frequency. As the coil changes its inductance and the frequency of the variable oscillator changes, the beats increase in frequency as the difference between the two frequencies becomes greater.

The beat frequency detector is rather broadly tuned to the range of beat frequencies which it is desired to measure. All other frequencies are rejected or filtered out by the input circuit of the detector, and not allowed to enter. Only the beat frequency comes through. With these provisions, the beat frequency detector then operates essentially as a frequency meter, and may be calibrated as desired. From the foregoing, it is apparent that, with the arrangement of Fig. 7, the difference in frequency of the oscillators is employed as the means for indicating the change in inductance of the coil.

It will be understood from the above that when the claims designate the current flowing in the bath merely as direct current, the claims are not limited to pure direct current, for the current may have a pulsating or periodic component.

What I claim is:

The combination with a liquid conducting medium having a pair of spaced electrodes therein and a direct current source connected to said electrodes to cause a direct current to flow through the medium from one of the electrodes to the other, of an apparatus responsive to the density of said direct current at a location in the medium, including a magnetic core of high permeability and readily saturable at low levels of magnetic field intensity immersed in the medium defining a substantially closed path substantially enclosing a cross-sectional area which is small in comparison with the total cross-sectional area of the medium through which current flows, said core being so locatable that the cross-sectional area it encloses is at an angle with respect to the direction of flow of said current, whereby one portion of said current flows through said cross-sectional area enclosed by the core in one direction and another portion flows only outside of said last-mentioned cross-sectional area and in substantially the same direction, a first coil wound on said core, whereby only said one portion of the current produces a substantial change in permeability of said core over that obtaining when no current flows through the core, means connected to said first coil responsive to the self-inductance thereof, the self-inductance of said first coil being a measure of the density of said one portion of the current, a resistance connected in the series circuit including said direct current source and said electrodes, a potentiometer connected across said resistance, a second coil having at least one turn wound on said core and having its opposite ends connected to the slide of said potentiometer and one end thereof, said second coil being so wound on said core with respect to the direction of current flowing therethrough that the magnetomotive force generated thereby opposes the magnetomotive force generated by said one portion of the current in the bath, and a current measuring instrument in series with said second coil, whereby the position of said slide may be adjusted so that the magnetomotive forces generated by the current in the second coil and said one portion of the current in the bath cancel and said current measuring instrument then provides an indication of the density of said one portion of the current in the bath.

References Cited in the file of this patent

UNITED STATES PATENTS

| | | |
|---|---|---|
| 1,374,918 | Heil | Apr. 19, 1921 |
| 1,825,514 | Fitzgerald | Sept. 29, 1931 |
| 2,542,057 | Relis | Feb. 20, 1951 |